Dec. 16, 1930. F. O. HOAGLAND 1,784,932
PROCESS OF WELDING DRILLS
Filed Feb. 1, 1928
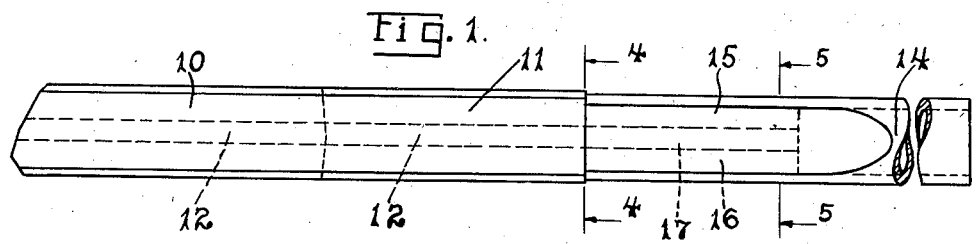
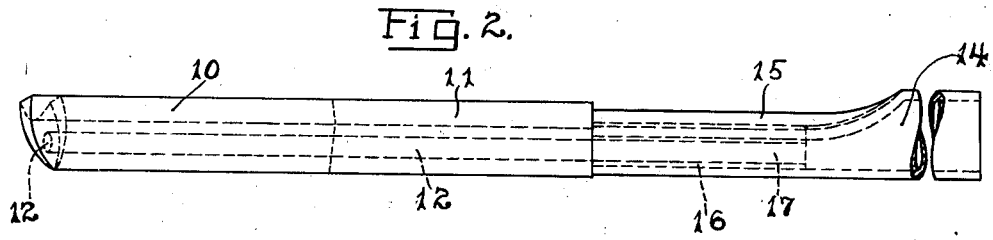
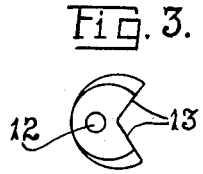 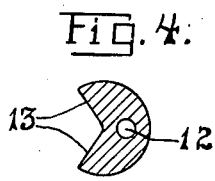 
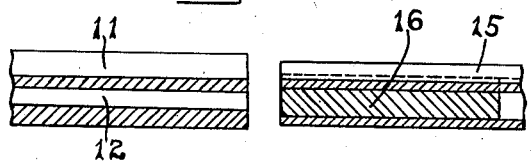
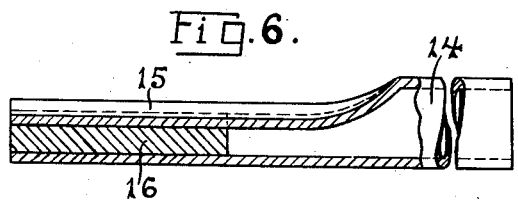
INVENTOR
F. O. Hoagland
BY
Joseph K. Schofield
ATTORNEY Patented Dec. 16, 1930

1,784,932

UNITED STATES PATENT OFFICE

FRANK O. HOAGLAND, OF HARTFORD, CONNECTICUT, ASSIGNOR TO PRATT & WHITNEY COMPANY, OF NEW YORK, N. Y., A CORPORATION OF NEW JERSEY

PROCESS OF WELDING DRILLS

Application filed February 1, 1928. Serial No. 251,109.

This invention relates to a method or process of welding together parts of different types of steels and particularly to a process of welding together a high speed or alloy steel drill bit and a long tubular shank.

An object of the present invention is to provide a drill of the type used in drilling deep holes in metal and provided with a lubricant passage throughout its length.

One feature of the invention that is advantageous is that the high speed of alloy steel is first welded to a carbon steel butt member of similar cross-section after which the carbon steel butt member is welded to a tube provided with a filler member completely closing one end, the filler and tube having the same cross-section as the butt member.

Another object of the invention is to provide a method of connecting a high speed drill bit to a tubular shank entirely by electric welding of the electrical resistance type.

A further object of the invention is to provide a drill bit of alloy or high speed steel welded to a carbon steel intermediate or butt member which in turn is directly welded to a steel tube provided with a steel filler member completely closing one end and extending a substantial distance within the tube.

Another advantage of the invention is that all machining operations on the periphery of the drill bit and butt member may be accomplished after all of the welding operations have been completed.

With these and other objects in view my invention consists in the steps in the process of operations set forth in the following specification and illustrated in the accompanying drawing.

In the accompanying drawing annexed hereto and forming a part of this specification, I have shown my invention embodied in a deep hole drill used for metal cutting, but it will be understood that the invention can be otherwise embodied and that the drawing is not to be constructed as defining or limiting the scope of the invention, the claims appended to this specification being relied upon for that purpose.

In the drawing:

Figure 1 is a longitudinal view of a complete deep hole drill made in accordance with the present process.

Fig. 2 is a similar longitudinal view looking in a direction at right angles to the drill shown in Fig. 1.

Fig. 3 is an end view of the drill bit.

Fig. 4 is a cross sectional view taken upon line 4—4 of Fig. 1.

Fig. 5 is a cross sectional view taken upon the line 5—5 of Fig. 1.

Fig. 6 is a longitudinal sectional view of the drill shank and filler used in connection with the drill bit, and Fig. 7 is a view of the butt member and drill shank with its filler in place preparatory to butt welding them together.

In the above mentioned drawing I have shown but one embodiment of the invention which is now deemed preferable, but it is to be understood that changes and modifications may be made within the scope of the appended claims without departing from the spirit of the invention.

Briefly, and in its broadest aspect, my invention comprises the following principal steps: First, butt welding a carbon steel member directly against one end of a suitable high speed drill bit, the drill bit and carbon steel butt member having similar cross-sections; second, inserting a filler of carbon steel a substantial distance within an elongated steel tube so that it will completely close one end thereof; third, butt welding the carbon steel butt member directly to the steel tube and its filler; and fourth, drilling the filler member throughout its length.

Referring more in detail to the figures of the drawing, I show in Figs. 1 and 2 a complete deep hole drill made in accordance with the present invention. In the past it has been the practice to directly weld or braze a carbon steel tube to the end of a high speed drill bit, the high speed drill bit being necessary to withstand the hard usage of operation during drilling and the tube being necessary to provide the length required for deep holes and to provide an opening throughout its length through which lubricant or coolant may be furnished to the drill bit. In use such drills have been unsatisfactory due to the impossibility of assuring a complete welding or brazing of the two dissimilar metals. Drills in use of this type have repeatedly failed at the point of brazure or welding. The present invention is designed to produce a deep hole drill which will be extremely durable and which may be welded entirely by electric means to provide extremely strong and permanent welds.

The drill bit 10, as above stated, is of high speed steel adapted to give highest efficiency and durability during drilling operations. This, as is well-known, is difficult to weld. The first step in the present process comprises directly butt welding a high carbon steel butt member 11 to the end of the drill bit 10. This carbon steel butt member 11 is of similar cross-section to the drill bit and may be directly butt welded in an electric butt welding machine of standard construction. Both of these members 10 and 11 may previously have been provided with an opening 12 extending throughout their length, this being suitably redrilled after the weld has cooled to provide a complete opening extending from end to end of these members 10 and 11 for supplying coolant or lubricant to the drill point. Also both of these members 10 and 11 may be provided with a recessed portion 13 extending throughout their length providing a passage for the removal of chips formed during the drilling operation.

The shank to be attached to the outer end of the butt member is made of tube 14 rolled for a portion of its length to the cross-sectional form indicated in the figures so that it has a recessed portion 15 joining those of the drill bit 10 and butt member 11 forming a continuous passage for the removal of the chips. Within one end of the tube 14 is inserted a filler member 16 made of steel similar to that of the butt member 11 and completely closing one end of the tubular shank 14. With the insert member 16 in position within the tubular shank 14 it is directly butt welded to the end of the butt member 11 in a standard electric butt welding machine. After this weld has been formed the insert member 16 is drilled throughout its length with a hole 17 joining the hole 12 extending through the drill bit 10 and butt member 11.

After this weld has been formed and cooled, all machining operations upon the exterior surface of the drill bit 10 and butt member 11 may be carried out and the drill hardened or heat treated to the degree necessary for the particular drilling operations which it is to withstand.

What I claim is:

1. The process of welding a drill bit to a tubular shank, comprising butt welding to a drill bit of alloy steel having a longitudinal hole therethrough a piece of carbon steel having a similar cross-section to the drill bit and having a longitudinal hole therein, butt welding a tubular shank to the end of the carbon steel, and longitudinally drilling through said drill bit and said carbon steel and into said tubular shank.

2. The process of welding an alloy steel drill bit to a carbon steel tubular shank, comprising butt welding to the drill bit a piece of carbon steel having a similar cross section to the drill bit, inserting a carbon steel filler into the end of a tubular shank and completely closing said end of said tubular shank, butt welding the shank and filler to the end of the carbon steel, and drilling the filler throughout its length.

3. The process of welding an alloy steel drill bit provided with a hole extending throughout its length to a carbon steel tubular shank, comprising butt welding to the drill bit a piece of carbon steel having a similar cross-section and longitudinally extending hole to the drill bit, inserting a solid carbon steel filler into the end of the tubular shank and completely closing one end of said tubular shank, butt welding the shank and filler to the end of the carbon steel, and drilling the filler throughout its length.

In testimony whereof, I hereto affix my signature.

FRANK O. HOAGLAND.